(12) United States Patent
Vyas et al.

(10) Patent No.: US 10,182,304 B2
(45) Date of Patent: Jan. 15, 2019

(54) UPDATING FIRMWARE OF IOT DEVICES

(71) Applicant: GainSpan Corporation, San Jose, CA (US)

(72) Inventors: Pankaj Vyas, Bangalore (IN); Vishal Batra, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 47 days.

(21) Appl. No.: 14/864,929

(22) Filed: Sep. 25, 2015

(65) Prior Publication Data

US 2016/0371074 A1    Dec. 22, 2016

(30) Foreign Application Priority Data

Jun. 18, 2015  (IN) .......................... 3062/CHE/2015

(51) Int. Cl.
| | | |
|---|---|---|
| G06F 9/44 | (2018.01) | |
| H04W 4/00 | (2018.01) | |
| H04W 4/50 | (2018.01) | |
| H04W 4/60 | (2018.01) | |
| H04W 4/70 | (2018.01) | |
| G06F 8/654 | (2018.01) | |
| H04W 84/12 | (2009.01) | |
| H04W 8/24 | (2009.01) | |

(52) U.S. Cl.
CPC ............ *H04W 4/003* (2013.01); *G06F 8/654* (2018.02); *H04W 4/50* (2018.02); *H04W 4/60* (2018.02); *H04W 4/70* (2018.02); *H04W 8/245* (2013.01); *H04W 84/12* (2013.01)

(58) Field of Classification Search
CPC .......... H04L 67/10; H04W 4/003; G06F 8/61; G06F 8/65
See application file for complete search history.

(56) References Cited

U.S. PATENT DOCUMENTS

| | | |
|---|---|---|
| 7,480,907 B1 | 1/2009 | Marolia et al. |
| 8,830,913 B1 | 9/2014 | Sosa et al. |
| 8,868,696 B2 | 10/2014 | Lewis et al. |
| 9,015,694 B2 | 4/2015 | Gray et al. |

(Continued)

FOREIGN PATENT DOCUMENTS

CN    103227813 A    7/2013

OTHER PUBLICATIONS

Hui Ung Park et al., Non-Invasive Rapid and Efficient Firmware Update for Wireless Sensor Networks, ACM, 2014, retrieved online on Aug. 27, 2018, pp. 147-150. Retrieved from the Internet: <URL: http://delivery.acm.org/10.1145/2640000/2638782/p147-park.pdf>. (Year: 2014).*

(Continued)

*Primary Examiner* — Hanh Thi-Minh Bui
(74) *Attorney, Agent, or Firm* — Pearl Cohen Zedek Latzer Baratz LLP

(57) ABSTRACT

An access point (AP) of a wireless network receives registration requests for a firmware update from a set of Internet of Things (IOT) devices. The AP determines availability of the firmware update at a remote server, and upon determining the availability, downloads the firmware update from the remote server into to a non-volatile storage and provides the firmware update to the set of IOT devices.

17 Claims, 5 Drawing Sheets

(56) References Cited

U.S. PATENT DOCUMENTS

| | | | |
|---|---|---|---|
| 2005/0148326 A1* | 7/2005 | Nogawa | H04L 41/0806 455/420 |
| 2005/0186952 A1 | 8/2005 | Kitajima | |
| 2013/0054729 A1 | 2/2013 | Jaiswal et al. | |
| 2014/0089912 A1 | 3/2014 | Wang et al. | |
| 2014/0223423 A1 | 8/2014 | Alsina et al. | |
| 2015/0007162 A1* | 1/2015 | Lewis | G06F 8/65 717/171 |
| 2015/0082297 A1 | 3/2015 | Parry et al. | |
| 2015/0201035 A1* | 7/2015 | Profit | H04L 67/2842 709/213 |
| 2016/0295616 A1* | 10/2016 | Zakaria | H04W 4/003 |

OTHER PUBLICATIONS

Efficient over-the-air software and firmware updates for the Internet of Things, http://embedded-computing.com/articles/efficient-software-firmware-updates-the-internet-things/ , downloaded circa Jun. 5, 2015, pp. 1-5.

Secure Software and Firmware Update, https://www.infineon.com/cms/en/applications/chip-card-security/internet-of-things-security/secure-software-and-firmware-update/ , downloaded circa Jun. 5, 2015, pp. 1-3.

Internet of Things (IoT) Embedded Systems Solutions, http://www.mentor.com/embedded-software/industries/internet-of-things, downloaded circa Jun. 5, 2015, pp. 1-3.

Stephen Brown, Cormac J. Sreenan, Software Updating in Wireless Sensor Networks: A Survey and Lacunae, Journal of Sensor and Actuator Networks 2013, date Nov. 14, 2013, pp. 1-44, ISSN: 2333-9721.

* cited by examiner

UPDATING FIRMWARE OF IOT DEVICES

PRIORITY CLAIM

The instant patent application is related to and claims priority from the co-pending India provisional patent application entitled, "OPTIMIZING OVER-THE-AIR FIRMWARE UPDATE FOR EMBEDDED WIFI STATIONS WITH CACHING OF THE FIRMWARE BY WIFI ACCESS POINT", Serial No.: 3062/CHE/2015, Filed: 18 Jun. 2015, which is incorporated in its entirety herewith to the extent not inconsistent with the disclosure herein.

BACKGROUND

Technical Field

Embodiments of the present disclosure relate generally to wireless networks, and more specifically to updating firmware of IOT (Internet of Things) devices.

Related Art

Internet of Things (IOT) is a network of physical devices or "things" with unique identifiers that are typically embedded within other systems that perform specific functions. IOT devices are designed to operate as wireless stations consistent with IEEE 802.11 family of standards (including IEEE 802.11a, 802.11b, 802.11g and 802.11n), and may communicate via an access point with each other as well as with other devices/systems on a network.

Typically IOT devices capture data with respect to a specific function, and wirelessly transmit that data to other IOT devices or to a central processing location for further processing. For example, IOT devices for sensing speed are typically embedded within speed cameras at traffic junctions. Such speed sensing IOT devices capture vehicle speeds and wirelessly transmit the captured speeds to a central processing location (e.g., a police station) for further processing.

In addition to capturing and sending data, IOT devices may also be set up to receive and process external inputs, and thus are capable of being externally monitored and controlled. For example, an IOT device monitoring a patient's heart rate may be set up to send diagnostics data to an external server upon an application on the external server requesting on-demand status information about the patient. As another example, an IOT device embedded in a thermostat system may be externally controlled by an application such that the temperature settings of the thermostat are set via inputs to the IOT device from the external application.

Firmware is a software program (i.e., set of instructions) that is designed to control the functions performed by the hardware portion of an IOT device. Firmware is typically stored either in internal non-volatile memory (e.g., ROM, EPROM), but may also be stored in an external (e.g., flash) memory, or in combination of both internal and external memory.

Updating firmware may be necessary to achieve any number of functions, as is well known in the art. For example, firmware updates to the software program help execute a new hardware function, fix a known problem, enable the hardware to work with a new operating system, bring the software in compliance with new software standards etc.

It is generally desirable that updates to an IOT device's firmware be performed in an efficient manner (e.g., by optimizing network bandwidth), as suited in the corresponding environments.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An access point (AP) of a wireless network provided according to an aspect of the present disclosure receives registration requests for a firmware update from a set of Internet of Things (IOT) devices. The IOT devices are also on the same wireless network. The AP determines availability of the firmware update at a remote server. Upon the firmware update (a new version of the firmware) being determined to be available, the AP downloads the firmware update from the remote server into to a non-volatile storage. Subsequently, the AP provides the firmware update to the set of IOT devices.

According to one aspect of the present disclosure, after downloading the firmware update from the remote server, the AP broadcasts availability of the firmware update to the set of IOT devices via a layer-2 broadcast message. In another aspect of the present disclosure, the AP sends unicast messages to the set of IOT devices notifying availability of the firmware update. Upon receiving notification of the availability of the firmware update, each of the set of IOT devices downloads the firmware, and sends a confirmation of the download to the AP. Once the AP receives such confirmation from all of the set of IOT devices, it removes the firmware update from its non-volatile storage.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
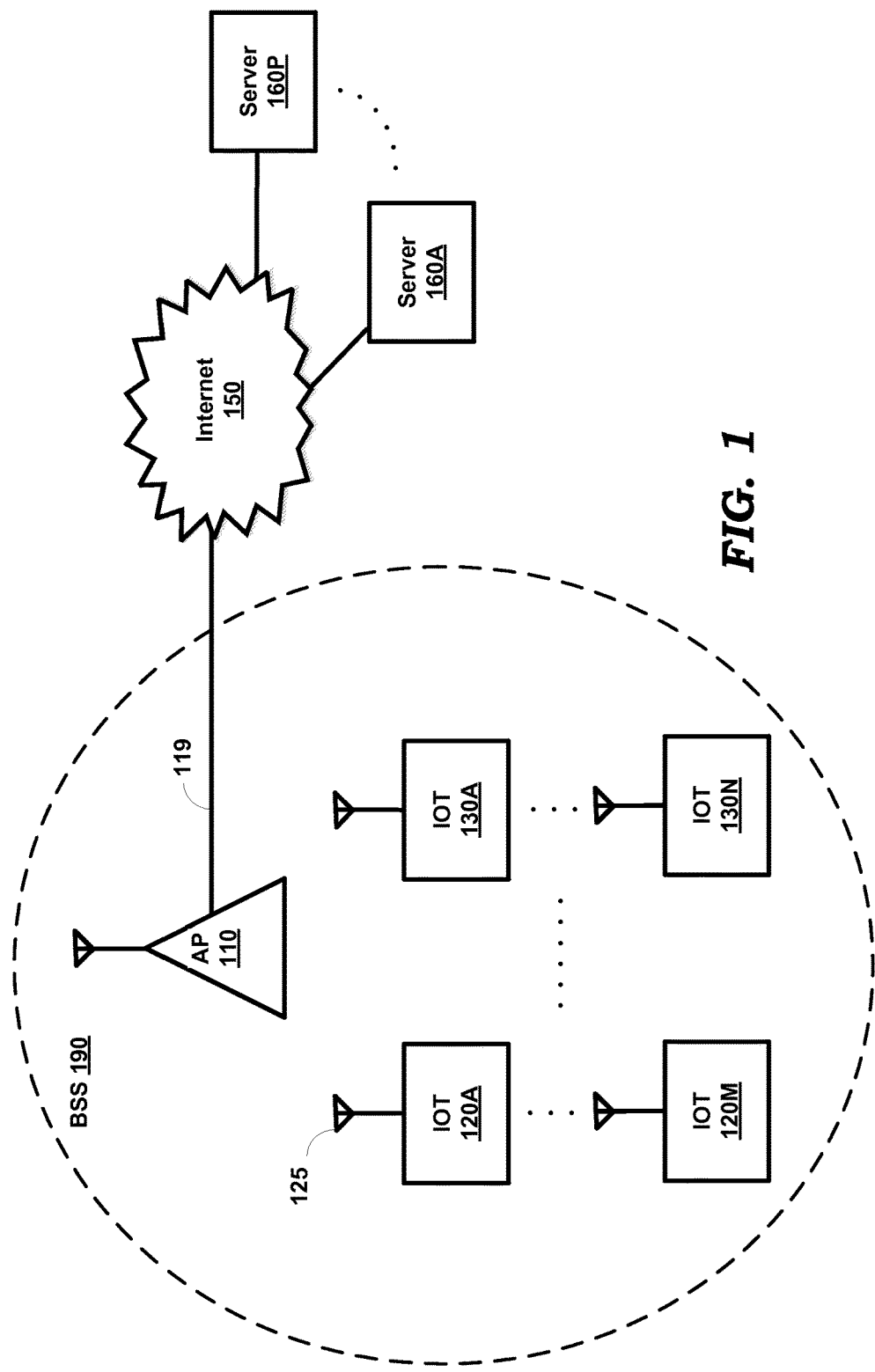
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real-world environments may contain more or fewer systems/devices. FIG. 1 is shown containing access point (AP) 110, IOT devices (IOT) 120A-120M and 130A-130N, servers 160A-160P, and Internet 150. The wireless network (WLAN) containing AP 110 and IOTs 120A-120M and 130A-130N may be referred to as an infrastructure basic service set (BSS) 190.

Each of IOTs 120A-120M and 130A-130N represents an Internet of Things device that captures data with respect to a specific function, and wirelessly transmits that data to other IOT devices in the network, or to an external device. Although the IOTs in the example of FIG. 1 are described as primarily functioning to capture and transmit data, the IOTs may also perform the functions of receiving and processing data from an external source, as noted earlier in the Background section.

Further, although each of the IOT devices are not shown embedded in another system, it will be understood by those ordinarily skilled in the art that the IOT devices are typically implemented as embedded devices in other systems, as noted above in the Background section. Therefore, while particular embodiments of the IOT devices have been shown and described, it will be obvious to those skilled in the art that changes and modifications may be made without departing from the true spirit and scope of this invention.

IOTs 120A-120M and 130A-130N may communicate with each other via AP 110 using layer-2 protocols specified as a part of the IEEE 802.11 standards. IOTs may however use IP addressing at least for communications with external devices accessible via Internet 150. Thus, in a typical implementation, each of IOTs 120A-120M and 130A-130N is assigned a unique IP address using DHCP type protocols well known in the relevant arts. Each IOT device may have a corresponding unique layer-2 address as well for layer-2 communications.

In the example environment of FIG. 1, it is assumed that IOTs 120A-120M are directed to one common function, and IOTs 130A-130N are directed to another common function. For example, IOTs 120A-120M may be embedded in light bulbs installed in a dwelling unit, collecting information about individual bulbs' electricity usage, as well as enabling the control of the light bulbs externally (e.g., using a Smartphone application). Similarly, IOTs 130A-130N may be embedded in household thermostats (e.g., multiple thermostats controlling temperatures at multiple levels of a dwelling), collecting energy usage and temperature information as well as enabling control externally, such as by using a Smartphone application. It is also assumed that the vendors for the set of IOTs 120A-120M and the set of IOTs 130A-130N are different. Therefore, different firmware updates may be necessary for corresponding updates to the IOT devices.

In an embodiment, AP 110, IOTs 120A-120M and 130A-130N form a basic service set (BSS) 190 consistent with IEEE 802.11 family of standards (including amendments such as 802.11a, 802.11b, 802.11i, 802.11n, etc.). However, in other embodiments, AP 110 and IOTs 120A-120M and 130A-130N may be designed to operate according to other wireless standards, such as for example, IEEE 802.15.4. The antenna of IOT 120A is shown numbered as 125. Antennas of other wireless devices of FIG. 1 are indicated by the corresponding symbol, but not numbered.

Servers 160A-160P represent computing devices at which the corresponding vendor/developers make the firmware updates available for download. In an embodiment, each of servers 160A-160P is designed to process a corresponding request for an updated firmware received from AP 110, and provide the updated firmware to AP 110. Each of servers 160A-160P is connected to internet 150, and can communicate using IP (Internet Protocol) with other devices/systems in internet 150, as well as with AP 110 and IOTs 120A-120M and 130A-130N.

Internet 150 extends the connectivity of devices (AP 110 and IOTs 120A-120M and 130A-130N) in BSS 190 to various devices/systems (e.g., servers 160A-160P) connected to, or part of, internet 150. Internet 150 is shown connected to AP 110 (which may be viewed as operating as a border router as well) through a wired path 119. Internet 150 may be implemented using protocols such as IP (Internet Protocol). In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

AP 110, in addition to performing operations consistent with the corresponding wireless standard, operates as an IP router to forward packets received from the other devices of FIG. 1 to the appropriate destination or next-hop device. AP 110, provided according to aspects of the present disclosure, facilitates upgrading of firmware in the IOT devices.

According to a prior technique, each of the IOT devices 120A-120M and 130A-130N initiated separate checks with corresponding servers 160A-160P for firmware updates, and subsequently individually downloaded and updated the respective firmware on each of the devices. Even devices which require the same firmware (e.g., IOT devices 120A-120M) still individually downloaded the firmware the corresponding number of times.

The prior approach may have a drawback in that it typically required setting up of multiple secure reliable sessions (e.g., HTTPS, SSL with TCP) to download the firmware, thereby incurring delays in downloading large firmware updates multiple times, and also inefficiently using the network bandwidth (in case of downloading the same firmware updates multiple times).

Aspects of the present disclosure overcome, among other things, the drawback noted above, as described next with respect to a flowchart.

3. Updating Firmware

Figure 2:
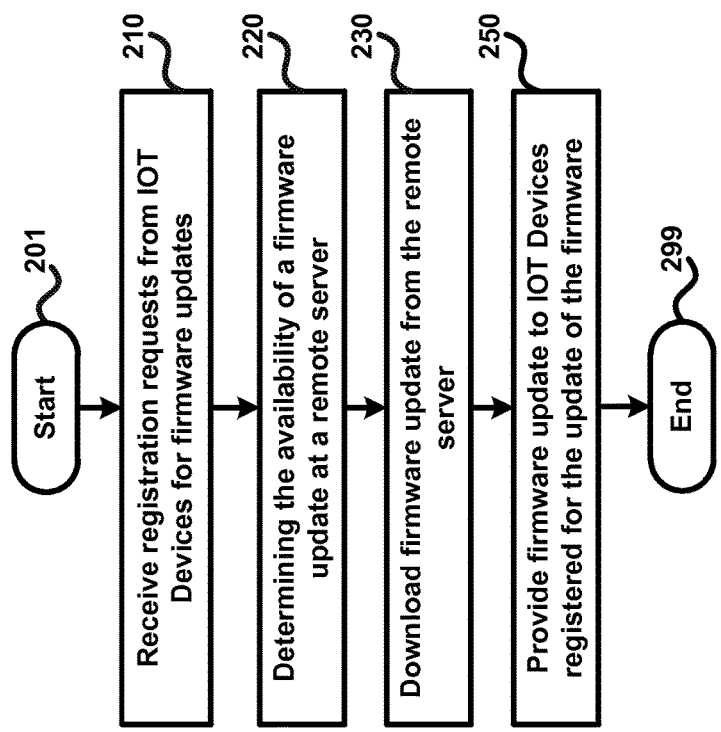
FIG. 2 is a flow chart illustrating the manner in which an access point of a wireless network provides firmware to IOT devices, in an embodiment of the present disclosure.

FIG. 2 is a flow chart illustrating the manner in which an access point of a wireless network provides firmware to IOT devices, in an embodiment of the present disclosure. The flowchart is described with respect to the environment of FIG. 1, merely for illustration. However, various features described herein can be implemented in other environments and using other components as well, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, AP 110 receives registration requests from IOT devices for firmware updates (update to a firmware). A registration request from an IOT device indicates that the IOT device is to receive any updates to the corresponding firmware. Among other things, the registration request identifies the IOT device as well as the firmware of interest, for example as the firmware is installed on the device. The registration request may be embedded within a WiFi frame such as a management frame, a control frame, or a data frame, the frame structures being well known in the relevant arts.

In one embodiment, AP 110 stores the registration requests in an internal or external non-volatile storage such that AP 110 maintains the current list of all IOT devices which have registered for future updates to respective firmwares. The list may include all the information provided earlier in the corresponding registration request. Further, for IOT devices that are from the same vendor (e.g., set of IOTs 120A-120M or the set of IOTs 130A-130N) for a similar function, a single firmware update may be sufficient to update all such devices from the same vendor.

In step 220, AP 110 determines the availability of a firmware update at a remote server. Normally, the firmware may be identified by a version number according to a convention such that the version number alone is sufficient to determine whether a firmware available on a remote server corresponds to a new version (or update). Thus if AP 110 has a firmware of a specific version number, and the version of the firmware copy on the remote server is of a later version number, the version on remote server is deemed to be an update of the firmware ("firmware update").

In an embodiment, AP 110 periodically checks with the corresponding servers 160A-160P for updates to each of the firmwares for which AP 110 has at least one registration request. In another embodiment, AP 110 simply waits for a notification of availability of a firmware update from a corresponding remote server 160A-160P.

In step 230, AP 110 downloads a firmware update from the remote server upon determining that a firmware update is available on a remote server. After AP 110 determines the availability of the firmware update (per step 220), it downloads the firmware update and stores it in internal non-volatile storage (e.g., ROM, EPROM), or an external storage (e.g., flash), or in combination of both internal and external storage.

In step 250, AP 110 provides the firmware update to IOT devices registered for the update of the firmware. In an embodiment, upon downloading the firmware update, AP 110 sends a layer-2 broadcast message (to all IOT devices in BSS 190) notifying the availability of the firmware updates. Alternately, since the registration request from the IOT devices indicates the identity of the firmware (as noted above), AP 110 sends a layer-2 unicast message to only those IOT devices that require the updated firmware. For example, AP 100 may identify the relevant IOT devices by querying the non-volatile storage where the registration requests are stored.

In case of a broadcast message, IOT devices for which the firmware update is inapplicable may simply ignore the broadcast message. Whether receiving a unicast or a broadcast message, IOT devices that need the firmware update download the corresponding firmware update from AP 110.

In other words, the firmware update is retrieved by each IOT device from AP 110, instead of each IOT device downloading from the server.

Alternately, instead of AP 110 sending unicast or broadcast messages notifying the IOT devices about the availability of firmware updates, IOT devices may periodically check with AP 110 for any available firmware updates (i.e., the status of availability), and download the firmware updates if available.

The features noted described above can be implemented in various ways in different embodiments. The description is continued with respect to a timing diagram illustrating the manner in which an access point provides firmware to an IOT device, in an embodiment of the present disclosure.

4. Timing Diagram

Figure 3:
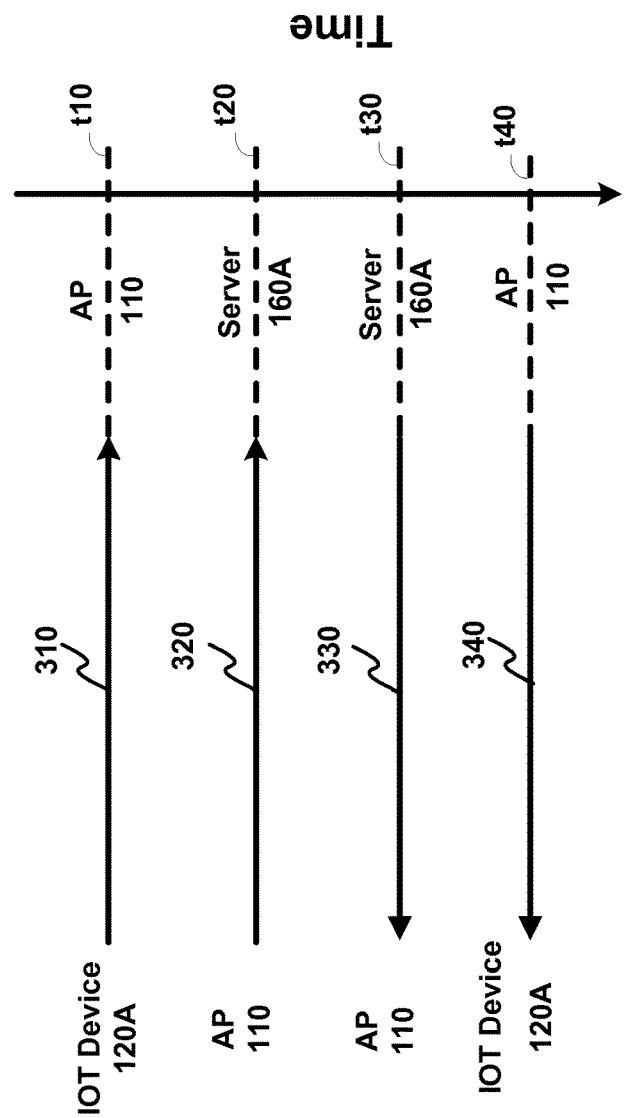
FIG. 3 is a timing diagram illustrating the manner in which an access point provides firmware to an IOT device, in an embodiment of the present disclosure.

FIG. 3 is a timing diagram illustrating the manner in which an access point provides firmware to an IOT device, in an embodiment, as described above with respect to flowchart of FIG. 2.

At time t10, IOT device 120A sends a message 310 to AP 110, with message 310 being a registration request to request AP 110 to be responsible for downloading and providing all future firmware updates (step 210).

In the example of FIG. 3, the registration request is part of an association request frame (a type of management frame). Association allows the AP to reserve resources for a particular IOT device. Association request frame format is described in detail in section 8.3.3.5 "Association Request frame format" of IEEE Std 802.11™-2012 available from IEEE. An association request frame contains some pre-defined fields (e.g., supported rates) as well as vendor-specific information element fields, which are fields that are customizable to suit a particular vendor's requirements.

In the example of FIG. 3, the registration request is programmed into the vendor-specific information element fields. Specifically, information on the vendor of the IOT device (e.g., the name/identity of the manufacturer), the firmware installed on the IOT device (e.g., the version number), as well as a vendor-specified location where future firmware updates can be downloaded (e.g., a URL of the remote server 160A) are all populated in the vendor-specific information fields.

After receiving the association request from device 120A, it is assumed that AP 110 accepts the request and stores the information contained in the vendor-specific information fields (e.g., in a look-up table) in a reserved non-volatile memory space. Although not shown, it is assumed that AP 110 maintains the vendor-specific information field data for all the other IOT devices in BSS 190 from which registration requests are received (and thus for which it is responsible for downloading and providing future firmware updates).

At time t20, AP 110 transmits message 320 to server 160A, with message 320 representing a query to server 160A for determining the availability of any updates to the firmware installed on IOT device 120A.

At time t30, after determining the availability of a firmware update for IOT device 120A, AP 110 downloads the firmware update (shown as message 330) from server 160A and stores it in non-volatile memory (step 230).

At time t40, IOT device 120A downloads the firmware update (shown as message 340) from AP 110A (per step 250). Upon downloading the firmware update (message 330), it is assumed that AP 110 sends a broadcast message to all IOT devices in BSS 190 notifying the availability of the firmware updates. In the example of FIG. 3, the broadcast message is part of a beacon frame. A beacon frame is a type of management frame in IEEE 802.11 based wireless networks. Beacon frames contain information about the network, and are transmitted by the AP periodically to announce the presence of a wireless LAN, as well known in the relevant arts.

After IOT device 120A receives the broadcast beacon frame from AP 110, IOT device 120A downloads the firmware update from AP 110 and notifies AP 110 of the successful download.

In an embodiment, AP 110 removes the firmware updates from its memory after all IOT devices, which have registered for the corresponding firmware update, have downloaded the firmware of interest (as confirmed by the respective notifications from each IOT device), or after a pre-determined timeout period set by an administrator in AP 110.

The description is continued with respect to the internal details of AP 110 in an embodiment.

5. Access Point

Figure 4:
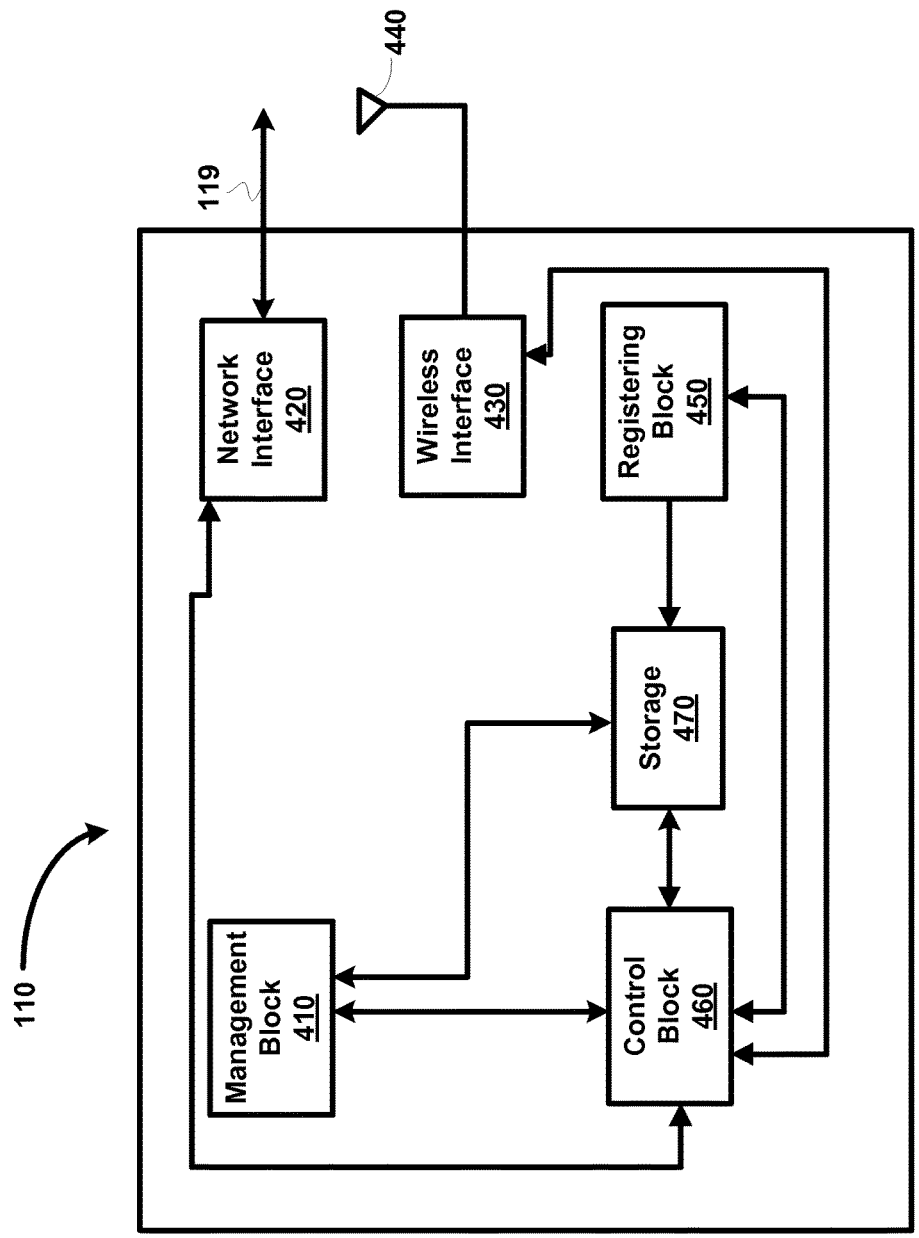
FIG. 4 is a block diagram illustrating the internal blocks of a wireless access point, in an embodiment.

FIG. 4 is a block diagram illustrating the internal blocks of AP 110, in an embodiment. AP 110 is shown containing management block 410, network interface 420, wireless interface 430, antenna 440, registering block 450, control block 460 and storage 470.

Network interface 420 provides connectivity to Internet 150 (e.g., using Internet Protocol), and may be used to enable AP 110 as well as other wireless devices in BSS 190 (e.g., IOT devices 120A-120M) to communicate (via path 119) with other systems connected to Internet 150 of FIG. 1 (e.g., servers 160A-160P).

Wireless interface 430 provides the hardware, software and firmware that enable AP 110 to communicate wirelessly (via antenna 440) with other wireless devices (such as those in BSS 190) according to IEEE 802.11 standards, well known in the relevant arts.

Control block 460 operates to provide the features of an access point according to IEEE 802.11 standards. Specifically, control block 460, in conjunction with network interface 420, enables wireless devices associated with AP 110 to communicate with devices on wired networks such as Internet 150 (shown in FIG. 1). Control block 460 may also enable associated IOT devices to communicate with each other.

Further, control block 460 operates to receive registration requests from IOT devices (e.g., as described with reference to FIGS. 2 and 3 above), via wireless interface 430. Control block 460 examines each registration request (in the form of an incoming packet), and passes the vendor-specific information field data (stored in corresponding fields) to registering block 450 for further processing. Additionally, control block 460 may broadcast beacon frames to notify IOT devices of availability of firmware updates (via wireless interface 430).

Registering block 450 operates to receive vendor-specific information field data of registration requests from control block 460 and to subsequently process the registration requests. Registering block 450 is designed to ignore faulty/invalid registration requests. For example, if the registration request contains incomplete information such as missing firmware identity or missing location for obtaining future firmware updates, registering block 450 may ignore such requests (e.g., discard them without further processing). For valid registration requests, registration block 450 operates to store the vendor-specific information field data of the registration requests in storage 470 for further processing. Specifically, registration block 450 stores the vendor-specific information field data (e.g., IOT device identities and the identities of the respective firmwares) of the registration requests in storage 470.

Storage 470 contains both volatile and non-volatile storage (e.g., memory) required for operation of various blocks of AP 110. The non-volatile storage may be used to store the vendor-specific information field data of valid registration requests representing the various registrations. It should be understood that several IOT devices may have registered for the same firmware upgrade, and accordingly the registration data in storage 470 may accordingly indicate that each of the IOT devices is registered to receive the corresponding firmware upgrade.

The non-volatile storage may also be used to store firmware updates that are downloaded by AP 110 from servers 160A-160P. Non-volatile storage may also store instructions, which when executed by management block 410, causes AP 110 to operate as described with respect to the flowchart of FIG. 2.

Management block 410 may perform a number of functions related to downloading and providing of firmware updates, as described with reference to the steps of FIG. 2. For example, management block 410 periodically checks with remote servers to determine the availability of corresponding firmware updates (step 220).

In an embodiment, management block 410 queries a remote server (via control block 460 and network interface 420) for a firmware update. In response, the remote server may return a version number associated with the corresponding firmware being hosted on the remote server (processed via control block 460 and network interface 420). Management block 410 may then review the vendor-specific information field data (i.e., part of the registration request data) stored in storage 470 to determine the version number of the associated firmware. If the version number sent by the remote server is higher than the version number stored in storage 470, management block 410 assumes the firmware available at the remote server to be an "update" to the version available in storage 470, and therefore downloads the firmware update (via control block 460 and network interface 420) to storage 470.

Management block 410 then sends a layer-2 broadcast message to all IOT devices in BSS 190 via control block 460 and wireless interface 430. Alternatively, management block 410 may access the vendor-specific information field data stored in storage 470 to identify specific IOT devices to which to send a unicast message notifying availability of firmware updates. Once the set of IOT devices are identified, management block 410, via control block 460 and wireless interface 430, notifies availability of firmware updates to each such IOT device, via a unicast message.

Though shown as different blocks (e.g., management block 410, registering block 450, and control block 460), the various functions described with respect to the blocks may be performed by one or more processors, which may be collectively referred to as a processing block.

Upon receiving confirmation of successful download of the firmware updates from each of the corresponding IOT devices (or after a pre-determined timeout period determined by an administrator), management block 410 removes the firmware updates from storage 470.

The description is continued with an illustration of the implementation details of an IOT device in an embodiment.

6. IOT Device

Figure 5:
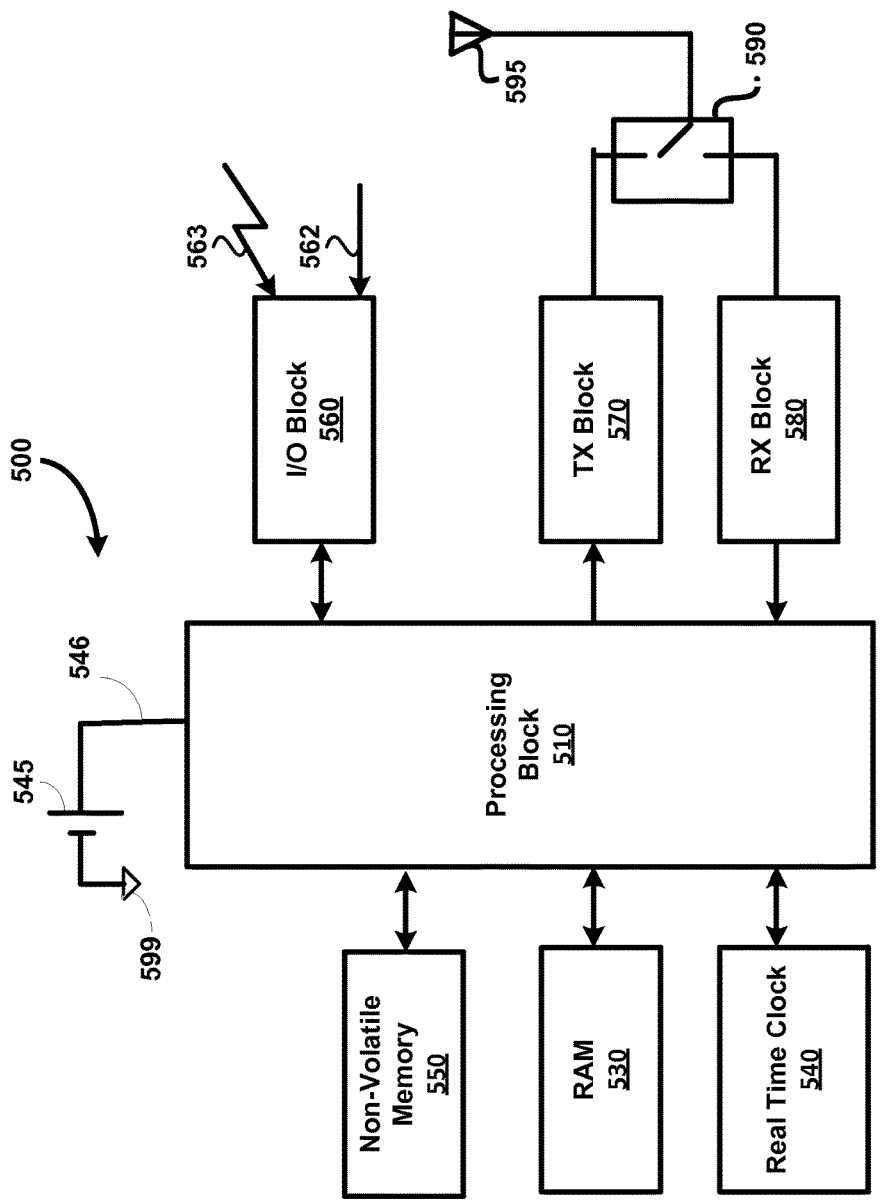
FIG. 5 is a block diagram illustrating the implementation details of an IOT device in an embodiment of the present disclosure.

FIG. 5 is a block diagram showing the implementation details of an IOT device in an embodiment of the present disclosure. Each of IOT devices 120A-120M and 103A-130N can be implemented as IOT device 500. IOT device 500 is shown containing processing block 510, random access memory (RAM) 530, real-time clock (RTC) 540, battery 545, non-volatile memory 550, input/output (I/O) block 560, transmit (TX) block 570, receive (RX) block 580, switch 590, and antenna 595. The whole of IOT device 500 may be implemented as a system-on-chip (SoC), except for battery 545 and antenna 595. Alternatively, the blocks of FIG. 5 may be implemented on separate integrated circuits (IC). Terminals 546 and 599 respectively represent a power and a ground terminal.

Battery 545 provides power for operation of IOT device 500, and may be connected to the various blocks shown in FIG. 5. While IOT device 500 is shown as being battery-powered, in another embodiment, IOT device 500 is mains-powered and contains corresponding components such as transformers, regulators, power filters, etc. RTC 540 operates as a clock, and provides the 'current' time to processing block 510.

Antenna 595 (corresponds to the antenna 125 of IOT device 120A, or to the antennas of AP 110 or the other IOT devices in BSS 190), and operates to receive from, and transmit to, a wireless medium, corresponding wireless signals (e.g., according to IEEE 802.11 (WLAN) standards). Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

TX block 570 receives, from processing block 510, packets (such as those associated with association request frame described above) to be transmitted on a wireless signal (e.g., according to a wireless standard such as IEEE 802.11), generates a modulated radio frequency (RF) signal (according to the standard), and transmits the RF signal via switch 590 and antenna 595. TX block 570 may contain RF and baseband circuitry for generating and transmitting wireless signals, as well as for medium access operations. Alternatively, TX block 570 may contain only the RF circuitry, with processing block 510 performing the baseband and medium access operations (in conjunction with the RF circuitry).

RX block 580 represents a receiver that receives a wireless (RF) signal (e.g., according to IEEE 802.11) bearing data and/or control information (such as those associated with broadcast/unicast messages from AP 110 described above) via switch 590, and antenna 595, demodulates the RF signal, and provides the extracted data or control information to processing block 510. RX block 580 may contain RF as well as baseband processing circuitry for processing a WLAN signal. Alternatively, RX block 580 may contain only the RF circuitry, with processing block 510 performing the baseband operations in conjunction with the RF circuitry.

I/O block 560 provides interfaces for user interaction with IOT device 500 (e.g., for control and monitoring by external devices, as described in the Background section and FIG. 1), and includes input devices and output devices. I/O block 560 may contain one or more sensors, as well as corresponding signal conditioning circuitry, and provides to processing block 510 (and/or non-volatile memory 550), measurements/values of physical quantities such as temperature, pressure, etc., (e.g., for sensing temperature and energy information described with respect to FIG. 1) sensed via wired path 562 or wireless path 563. I/O block 560 may perform analog-to-digital conversion of the measurement/values prior to forwarding the measurements/values to processing block 510.

Non-volatile memory 550 is a non-transitory machine readable medium, and stores instructions (e.g., firmware described in the Background section and with reference to FIG. 1), which when executed by processing block 510, causes IOT device 500 to perform the functions the IOT device is designed to perform (e.g., for sensing temperature and energy information described with respect to FIG. 1). Non-volatile memory 550 also stores any information obtained by the I/O block 560 with respect to any values or measurements that are obtained by the corresponding sensors disposed as part of the I/O block 560.

RAM 530 is a volatile random access memory, and may be used for storing instructions and data. RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable IOT device 500 to operate according to several aspects of the present disclosure, described above in detail. For example, processing block 510 may process a broadcast message to determine whether a firmware update available with AP 110 needs to be downloaded. As a further example, processing block 510 may generate the association request frame that is sent to AP 110 to request the AP to take responsibility of all future firmware updates.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method for updating firmware in IOT (Internet of Things) devices in a wireless network, said method comprising:

receiving, by an access point (AP) according to a protocol standard of said wireless network, registration requests for a respective firmware update of a plurality of firmware updates from a corresponding set of IOT devices of a plurality of sets of IOT devices in said wireless network, wherein each of said registration requests contains information elements, wherein the AP is a separate device from each of the sets of IOT devices;

determining, by said AP, availability of each of said plurality of firmware updates at a remote server based on information contained in said information elements;

downloading, by said AP, said firmware update determined to be available from said remote server; and providing, by said AP, said downloaded firmware update to said corresponding set of IOT devices from which registration requests are received for the downloaded firmware update.

2. The method of claim 1, wherein said firmware update is stored in a non-volatile storage of said AP upon said downloading, said providing comprising:
broadcasting availability of said firmware update to said corresponding set of IOT devices via a layer-2 broadcast message, wherein each of said corresponding set of IOT devices is designed to download said firmware update upon notification of said availability;
receiving a confirmation of successful download of said firmware update from each of said corresponding set of IOT devices; and
removing said firmware update from said non-volatile storage of said AP upon receipt of confirmation from all of said corresponding set of IOT devices,
wherein said broadcasting, said receiving and said removing are also performed by said AP.

3. The method of claim 1, wherein said firmware update is stored in a non-volatile storage of said AP upon said downloading, said providing comprising:
sending a respective unicast message to each of said corresponding set of IOT devices notifying availability of said firmware update, wherein each of said corresponding set of IOT devices is designed to download said firmware update upon receipt of the corresponding unicast message;
receiving a confirmation of successful download of said firmware update from each of said corresponding set of IOT devices; and
removing said firmware update from said non-volatile storage of said AP upon receipt of confirmation from all of said corresponding set of IOT devices, wherein said sending, said receiving and said removing are also performed by said AP.

4. The method of claim 1, wherein said firmware update is stored in a non-volatile storage of said AP upon said downloading, wherein said providing comprising:
receiving an inquiry from each of said corresponding set of IOT devices for status of availability of said firmware update,
wherein a response is sent indicating availability of said firmware update after said downloading of said firmware update;
receiving a confirmation of successful download of said firmware update from each of said corresponding set of IOT devices; and
removing said firmware update from said non-volatile storage of said AP upon receipt of confirmation from all of said corresponding set of IOT devices, wherein said receiving of said inquiry and said confirmation and said removing are also performed by said AP.

5. The method of claim 1, wherein said information elements identify:
a vendor;
a specific firmware installed on the IOT device from which the information element is sent to said AP; and
a vendor-specified location where updates to said firmware can be downloaded.

6. The method of claim 1, wherein said protocol standard of said wireless network is IEEE 802.11 standards.

7. A non-transitory machine readable medium storing one or more sequences of instructions for updating firmware in IOT (Internet of Things) devices, wherein execution of said one or more instructions by one or more processors contained in an access point (AP) of a wireless network causes said AP to perform the actions of:
receiving, by said AP according to a protocol standard of said wireless network, registration requests for a respective firmware update of a plurality of firmware updates from a corresponding set of IoT devices of a plurality of sets of IOT devices in said wireless network, wherein each of said registration requests contains information elements, wherein said AP is a separate device from each of the sets of IOT devices;
determining, by said AP, availability of each of said plurality of firmware updates at a remote server based on information contained in said information elements;
downloading, by said AP, said firmware update determined to be available from said remote server; and
providing, by said AP, said each downloaded firmware update to said corresponding set of IOT devices from which registration requests are received for the downloaded firmware update.

8. The non-transitory machine readable medium of claim 7, wherein said firmware update is stored in a non-volatile storage of said AP upon said downloading, said providing comprising:
broadcasting availability of said firmware update to said corresponding set of IOT devices via a layer-2 broadcast message, wherein each of said corresponding set of IOT devices is designed to download said firmware update upon notification of said availability;
receiving a confirmation of successful download of said firmware update from each of said corresponding set of IOT devices; and
removing said firmware update from said non-volatile storage of said AP upon receipt of confirmation from all of said corresponding set of IOT devices,
wherein said broadcasting, said receiving and said removing are also performed by said AP.

9. The non-transitory machine readable medium of claim 7, wherein said firmware update is stored in a non-volatile storage of said AP upon said downloading, said providing comprising:
sending a respective unicast message to each of said corresponding set of IOT devices notifying availability of said firmware update, wherein each of said corresponding set of IOT devices is designed to download said firmware update upon receipt of the corresponding unicast message;
receiving a confirmation of successful download of said firmware update from each of said corresponding set of IOT devices; and
removing said firmware update from said non-volatile storage of said AP upon receipt of confirmation from all of said corresponding set of IOT devices,
wherein said sending, said receiving and said removing are also performed by said AP.

10. The non-transitory machine readable medium of claim 7, wherein said firmware update is stored in a non-volatile storage of said AP upon said downloading, wherein said providing comprising:
receiving an inquiry from each of said corresponding set of IOT devices for status of availability of said firmware update,
wherein a response is sent indicating availability of said firmware update after said downloading of said firmware update;
receiving a confirmation of successful download of said firmware update from each of said corresponding set of IOT devices; and removing said firmware update from said non-volatile storage of said AP upon receipt of confirmation from all of said corresponding set of IOT devices, wherein said receiving of said inquiry and said confirmation and said removing are also performed by said AP.

11. The non-transitory machine readable medium of claim 7, wherein said information elements identify:
   a vendor;
   a specific firmware installed on the IOT device from which the information element is sent to said AP; and
   a vendor-specified location where updates to said firmware can be downloaded.

12. The non-transitory machine readable medium of claim 7, wherein said protocol standard of said wireless network is IEEE 802.11 standards.

13. An access point (AP) of a wireless network, said AP comprising:
   a processing block and a memory,
   said memory to store instructions which when retrieved and executed by said processing block causes said AP to perform the actions of:
   receiving, by said AP according to a protocol standard of said wireless network, registration requests for a respective firmware update of a plurality of firmware updates from a corresponding set of Internet of Things (IOT) devices of a plurality of sets of IOT devices in said wireless network, wherein each of said registration requests contains information elements, wherein said AP is a separate device from each of the sets of IOT devices;
   determining, by said AP, availability of each of said plurality of firmware updates at a remote server based on information contained in said information elements;
   downloading, by said AP, said firmware update determined to be available from said remote server; and
   providing, by said AP, said each downloaded firmware update to said corresponding set of IOT devices from which registration requests are received for the downloaded firmware update.

14. The AP of claim 13, wherein said protocol standard is IEEE 802.11, wherein said firmware update is stored in a non-volatile storage of said AP upon said downloading, said providing comprising:
   broadcasting availability of said firmware update to said corresponding set of IOT devices via a layer-2 broadcast message, wherein each of said corresponding set of IOT devices is designed to download said firmware update upon notification of said availability;
   receiving a confirmation of successful download of said firmware update from each of said corresponding set of IOT devices; and
   removing said firmware update from said non-volatile storage of said AP upon receipt of confirmation from all of said corresponding set of IOT devices, wherein said broadcasting, said receiving and said removing are also performed by said AP.

15. The AP of claim 13, wherein said firmware update is stored in a non-volatile storage of said AP upon said downloading, said providing comprising:
   sending a respective unicast message to each of said corresponding set of IOT devices notifying availability of said firmware update, wherein each of said corresponding set of IOT devices is designed to download said firmware update upon receipt of the corresponding unicast message;
   receiving a confirmation of successful download of said firmware update from each of said corresponding set of IOT devices; and
   removing said firmware update from said non-volatile storage of said AP upon receipt of confirmation from all of said corresponding set of IOT devices,
   wherein said sending, said receiving and said removing are also performed by said AP.

16. The AP of claim 13, wherein said firmware update is stored in a non-volatile storage of said AP upon said downloading, wherein said providing comprising:
   receiving an inquiry from each of said corresponding set of IOT devices for status of availability of said firmware update,
   wherein a response is sent indicating availability of said firmware update after said downloading of said firmware update;
   receiving a confirmation of successful download of said firmware update from each of said corresponding set of IOT devices; and removing said firmware update from said non-volatile storage of said AP upon receipt of confirmation from all of corresponding said set of IOT devices,
   wherein said receiving of said inquiry and said confirmation and said removing are also performed by said AP.

17. The AP of claim 13, wherein said information elements identify:
   a vendor;
   a specific firmware installed on the IOT device from which the information element is sent to said AP; and
   a vendor-specified location where updates to said firmware can be downloaded.

* * * * *